Oct. 8, 1940.         C. J. CRANE ET AL         2,216,737
                         RATE INDICATOR
            Filed June 9, 1938         3 Sheets-Sheet 1

INVENTORS
CARL J. CRANE
FRANCIS G. NESBITT
BY
ATTORNEYS

INVENTORS
CARL J. CRANE
FRANCIS G. NESBITT
BY
ATTORNEYS

Patented Oct. 8, 1940

2,216,737

UNITED STATES PATENT OFFICE 2,216,737

RATE INDICATOR

Carl J. Crane, Fairfield, and Francis G. Nesbitt, Dayton, Ohio

Application June 9, 1938, Serial No. 212,741

7 Claims. (Cl. 73—233)

(Granted under the act of March 3, 1883, as amended April 30, 1928; 370 O. G. 757)

The invention described herein may be manufactured and used by or for the Government for governmental purposes, without the payment to us of any royalty thereon.

This invention is a novel means to obtain indication of rate from any summation device. This invention may be applied to any type of summation device, but only two typical examples have been selected for the purpose of this description; namely, speed indicator and a rate of fuel flow indicator.

The primary value of this invention lies in the fact that in general summation mechanisms are much more accurate than rate mechanisms. For example, rate of flow meters are available which are based on the differential pressure obtained through a Venturi tube or orifice. Such flow meters depend upon density, temperature and viscosity of the fluid being measured. Also, it is imperative that the venturi or orifice remain spotlessly clean. Because of these things the accuracy is not always as desired. With a summation device such as a positive displacement type fuel consumed meter, the fuel is actually measured out by volume and the volume passed is counted by a counter or similar mechanism. It is the purpose of this invention to obtain an indication of rate from this type of device and thereby obtain the greater accuracy it offers. This invention may also be applied to an air speed indicator of the anemometer type.

The following description will show in greater detail the manner in which this invention may be applied to a flow meter and a speed indicator:

Figure 1:
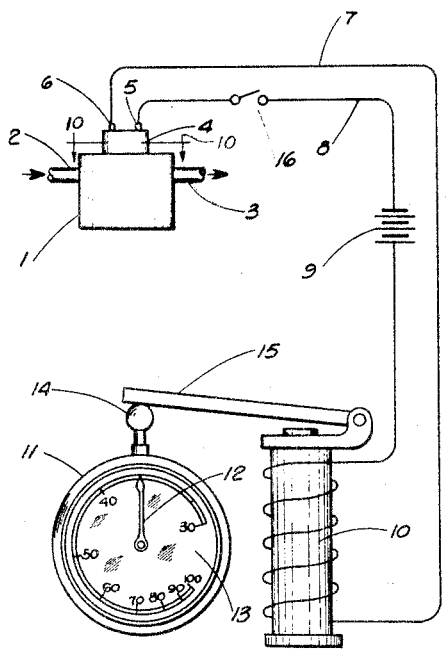
Figure 1 shows the invention applied to any positive displacement type fuel consumed meter of any well known type.

In Figure 1, 1 is a positive displacement type of fuel consumed meter of any well-known design through which fuel is passed on the way to the carburetor from the fuel tank. The fuel enters from the fuel tank at pipe 2 and leaves for the carburetor at pipe 3. This meter incorporates a cam and contactor and serves as an electric switch within compartment 4 which closes each time a known quantity of fuel passes through; for example, every 1/100 of a gallon, the terminals 5 and 6 are connected by conductor 7 and 8 in series with a source of electric power 9 to solenoid 10. Indicator 11 has a mechanism identical with any conventional type of stop watch, preferably one in which the pointer 12 makes one revolution over the scale 13 ever 10 seconds. The stop watch starting, stopping and resetting knob 14 is actuated by solenoid 10 by means of lever 15. Switch 16 is provided to turn the instrument off when it is not in use in case the contacts in the meter should stop in the closed position.

The invention, as described in Figure 1, operates as follows:

As fuel is measured out by meter 1, the electric circuit is momentarily closed by terminals 5 and 6, which permits the source of power 9 to energize solenoid 10 and the arm 15 is thereby depressed and also depresses knob 14 of the stop watch 11. The stop watch pointer 12 starts to rotate in a clock-wise direction and continues to rotate over scale 13 until 1/100 gallon of fuel has passed through the meter 1, at which time the contacts in the meter 1 again close the circuit momentarily, thereby energizing solenoid 10 and depressing the arm 15 and knob 14, which stops the stop watch. The position of the pointer 12 on scale 13 may then be read directly in terms of flow per minute (or hour). The pointer 12 remains stationary at its reading until 1/100 gallon more has passed through the meter 1, at which time the solenoid 10 is again energized. This time, however, the pointer of the stop watch is re-set to zero. As the next 1/100 gallon passes through the meter, this process is repeated. It is obvious that the longer the stop watch is allowed to run, the slower the fuel is passing through the meter, and the shorter the time the stop watch is allowed to run, the faster the fuel is passing through the meter. The dial 13 shown in stop watch 11 is graduated approximately in gallons per hour. It may be seen from this description that the flow may be read during the time the pointer is stationary on the scale prior to being re-set to zero.

Figure 2:
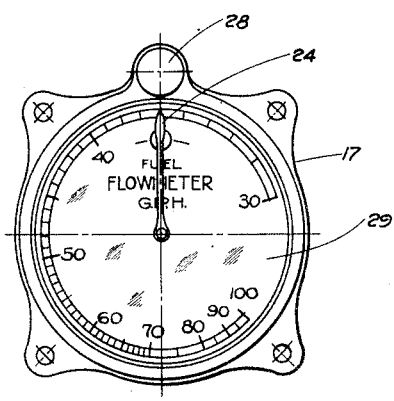
Figure 2 shows the face of an indicator for use with the rate of fuel flow meter as shown in Figure 1.

Figure 2 shows the face of an indicator for use in arrangement of the invention as shown in Figure 1. This indicator incorporates within its case the solenoid 10 and arm 15 and stop watch 11 of Figure 1.

Figure 3:
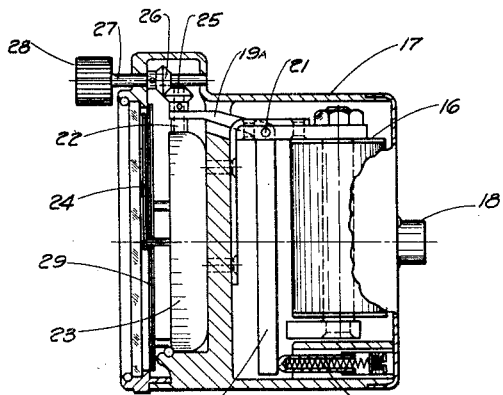
Figure 3 is a cross sectional view of the fuel flow meter shown in Figure 2.

Figure 3 is a cross-sectional view of Figure 2. Solenoid 16 is attached to case 17 and has its electric terminals available in connector socket 18. When the solenoid 16 is energized, arm 19 is moved to depress spring 20. When arm 19 is moved the extension 19a thereon is depressed because arm 19 is pivoted on pivot 21. When arm 19a is depressed, the stem 22 of stop watch 23 is depressed to start, stop and re-set the pointer 24. On the stop watch stem 22 is mounted bevel gear 25 meshing with bevel gear 26 on shaft 27, permitting knob 28 to be used for winding the spring of stop watch. The pointer 24 of the stop watch moves over the scale 29 as previously described for the stop watch in Figure 1.

Figure 4:
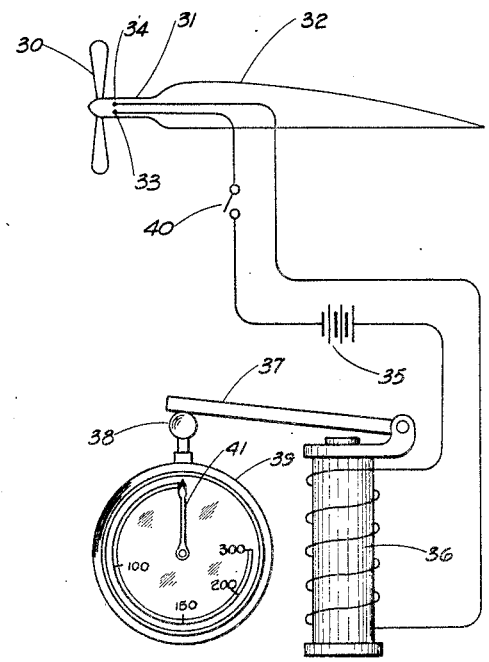
Figure 4 shows the invention applied to an air impeller on an airplane (commonly known as an "air log") to obtain an indication of air speed.
Figure 10:
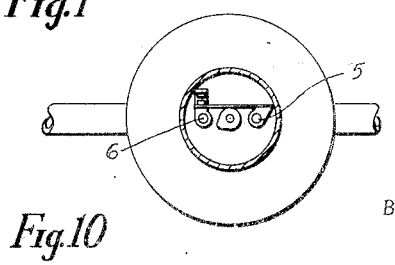
Figure 10 is a sectional view taken along the line 10—10 of Figure 1.

Figure 4 illustrates one way in which the invention may be applied to the impeller of any conventional "air log" for aircraft in order to obtain an indication of air speed. Impeller 30 of the air log is mounted in free air by a support 31 on airplane wing 32. This impeller 30 screws through the air as the craft moves forward and causes a pair of contacts 33 and 34 to close each time a predetermined distance is traveled. For example, say the contacts 33 and 34 are closed by the impeller 30 every $\frac{1}{10}$ of a mile distance traveled. When closed, the contacts 33 and 34 momentarily permit the source of electrical power 35 to energize the solenoid 36, which in turn depresses arm 37 and knob 38 of the stop watch indicator 39. Switch 40 permits the device to be turned off when not in use.

Operation of the air speed indicator shown in Figure 4 may be described as follows: The air log contacts 33 and 34 are closed momentarily by the rotation of impeller 30. This energizes solenoid 36 and depresses arm 37 and knob 38 thereby starting stop watch pointer 41. The pointer 41 continues to rotate at its known constant rate until the air log impeller indicates a distance of $\frac{1}{10}$ of a mile has been passed, at which time solenoid 36 is again energized. This time the depression of knob 38 stops the pointer 41 on its scale, permitting it to read directly in miles per hour. The pointer 41 remains at its position on the scale until an additional distance of $\frac{1}{10}$ of a mile has been passed, at which time the solenoid 36 is again energized. This time, however, the pointer is re-set to zero, where it remains for the next $\frac{1}{10}$ mile distance. The next closing of the contacts 33 and 34 will start the pointer again and the cycle is repeated. The airspeed may be read during the time the pointer is stopped on its scale reading. The indicator as shown in Figures 2 and 3 may readily be used for the airspeed indicator shown in Figure 4 by substituting a dial graduated in miles per hour for the dial shown in Figure 2.

Figure 5:
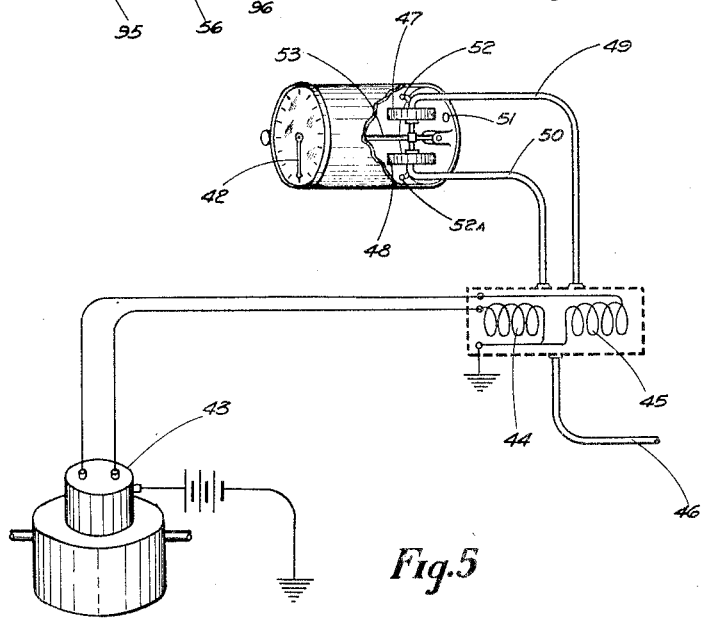
Figure 5 shows another application of this invention to a rate of fuel flow meter.

Figure 5 shows another means of applying this invention to a rate of flow meter in which the stop watch mechanism previously described is replaced by a continuously running clock mechanism. In this arrangement the indicating pointer 42 is pneumatically engaged to start, stop and re-set. A cam arrangement in the fuel consumed meter 43 alternately energizes solenoid 44 and 45, which in turn connects a source of suction 46 to first diaphragm 47 and then diaphragm 48 by means of connecting tubes 49 and 50, respectively. By this arrangement, the electromagnetic suction valve may be located at a distance from the indicator to eliminate the magnetic effect on adjacent instruments. Diaphragm 47 is depressed when solenoid 45 is energized by the cam arrangement in meter 43. This is because a flow of air is induced into vent 51 of indicator case, thence to bleed hole 52 through tube 49 and thence to the source of suction. When diaphragm 47 is depressed, the indicating means—is caused to be actuated by the clock mechanism and when diaphragm 48 is depressed due to the energizing of solenoid 44, the indicating means is re-set to zero position, as will be described in further detail hereinafter.

Figure 6:
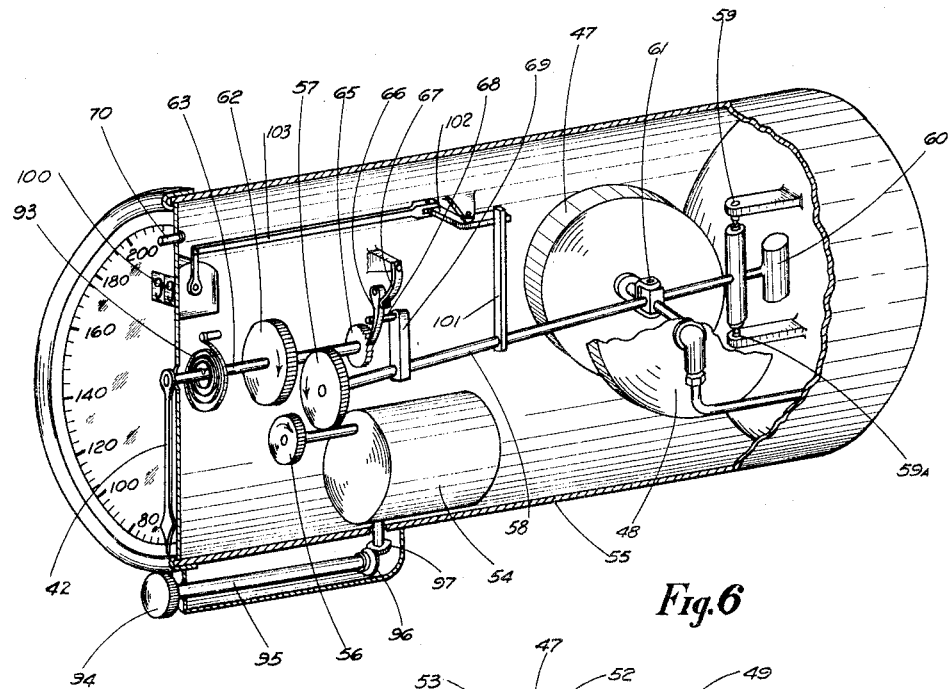
Figure 6 shows a sectional view of the indicator used in the arrangement shown in Figure 5.

In Figure 6 a clock mechanism 54 is mounted in case 55 and is provided with a continuously running driving gear 56. Gear 57 is mounted on shaft 58 which is pivotally mounted on bearings 59 and 59a. An extension of arm 58 carries counterweight 60. Diaphragm 47 is attached on one side to case 55 and on the other side to arm 58 by means of swivel connection 61. When diaphragm 47 is depressed, as previously described, arm 58 is pulled toward diaphragm 47 causing gear 57 to mesh simultaneously with gears 56 and 62. When these gears are thusly meshed, the continuously running clock work 54 with gear 56 rotates gear 57 and gear 62. Since the gear 62 is attached to shaft 63, and also carrying pointer 42, said pointer will rotate clockwise at a constant known speed. As soon as the suction is removed from diaphragm 47, it returns to its original position in which gear 57 is again out of mesh with gears 56 and 62. On shaft 63 is a ratchet wheel 65 which holds the pointer in its last position by means of pawl 66 pivotally mounted to case 55. Spring 67 is attached at one end to case 55 and bears on pawl 66, causing the pointer to be held in its last position. With the arm 58 in its last described neutral position, pin 68 just clears pawl 66.

When diaphragm 48 is depressed by action described above under Figure 5, arm 58 is caused to move about its axis 59 and 59a, and cause pin 68, which is rigidly attached by arm 69 to arm 58, to raise the pawl 66 from the ratchet wheel 65 causing the pointer to return to its zero position against the pin 70 by action of hairspring 93. Knob 94 on shaft 95 which carries bevel gear 96 meshing with gear 97 is provided to enable the clock mechanism 54 to be wound periodically by turning the knob 94. Counter 100 is readable on the face of dial and is actuated each time arm 58 is moved toward diaphragm 47 by arm 101, bell crank 102 and link 103. Bell crank 102 is pivotally mounted on case 55. With this arrangement, the counter may be selected so that it will indicate the volume of fuel which has passed through the meter.

Figure 7:
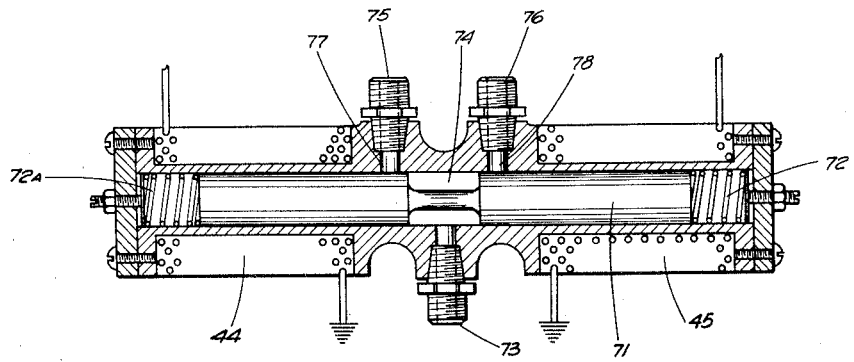
Figure 7 shows the electro-magnetic suction valve for use in the arrangement shown in Figure 5.

Figure 7 shows a cross sectional view of the electromagnetic suction valve previously described under Figure 5. This element consists of solenoid 44 and solenoid 45 in which plunger 71 is held in neutral position by springs 72 and 72a. Fitting 73 is for connecting chamber 74 to a source of suction. Fittings 75 and 76 are for connections to diaphragms 48 and 47, respectively. It may be seen that when solenoid 44 is energized, plunger 71 moves to the left, causing port 77 to be connected to suction cavity 74 and thence to source of suction through fitting 73. When solenoid 45 is energized, plunger 71 moves to the right uncovering port 78 to suction cavity 74 and thence to source of suction through fitting 73.

Figures 8, 8A:
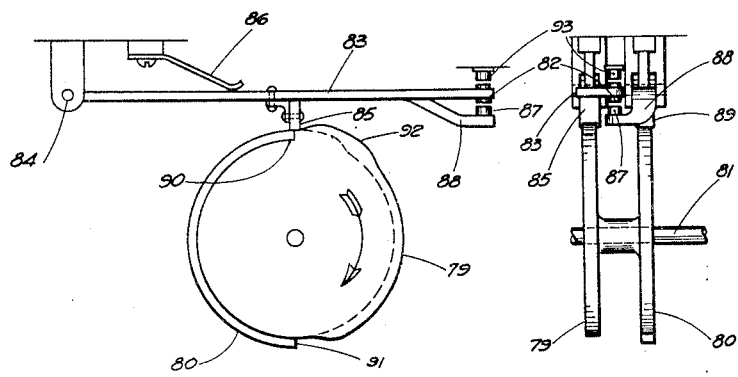
Figure 8 shows the arrangement of contactors to be incorporated in the fuel consumed meter used in the arrangement shown in Figure 5.

Figure 8 shows a double cam arrangement which is located within the meter 43 of Figure 5. Cams 79 and 80 are rigidly attached to shaft 81. Shaft 81 is the rotating shaft of meter 43 and its rotation is proportional to the volume of fuel going through the meter 43. Contact 82 is carried on arm 83, which is pivotally mounted in the case of the fuel meter on pivot 84. Arm 83 carries cam follower 85 bearing on cam 79 by action of spring 86 attached to the case of fuel meter. Contact 87 is carried on arm 88 which has a cam follower 89 bearing on cam 80. Contact arm 88 is also pivotally mounted and is spring loaded in a manner identical with that of arm 83. As cams 79 and 80 rotate with the shaft 81 in the direction shown by the arrow, cam follower 85 drops when it comes to depression 90 closing contacts 82 and 87. These contacts remain closed during exactly one-half of a revolution of shaft 81. When cam follower 89 reaches ledge 91 on cam 80, it drops, causing contact 87 supported on arm 88 to drop away from contact 82, thus opening the circuit. As the shaft 81 continues to rotate, cam follower 85 slowly climbs back up to its original level on cam 79 and continues at this level until it reaches raised portion 92, at which point contact 82 is raised above its normal level and closes the circuit with contact 93. While contacts 82 and 93 are closed, cam follower 89 slowly climbs to its normal level on cam 80 to a position for starting the next cycle.

The operation of the arrangement shown in Figure 5, with details shown in Figures 6, 7 and 8, may be described as follows:

As fuel flows through meter 43, shaft 81 contained therein rotates. When ledge 90 on cam 79 is reached cam follower 85 drops, closing contacts 82 and 87. When contacts 82 and 87 are closed, solenoid 45 is energized, which moves plunger 71 to the right, causing a flow of air through case vent 51, bleeder hole 52, tube 49, suction chamber 74 and thence to the source of suction. This flow of air reduces the pressure within diaphragm 47, causing it to be depressed. When diaphragm 47 is depressed, arm 58 moves toward diaphragm 47 causing gear 57 to mesh simultaneously with gears 56 and 62. Since gear 56 is running continuously by clock mechanism 54, pointer shaft 63 is therefore caused to rotate at a constant speed. Shaft 63 continues to rotate until cam follower 89 reaches ledge 91 on cam 80. This point is reached after a known volume of fuel has gone through meter 43. When cam follower 89 drops off ledge 91 of cam 80, contact 87 drops down away from contact 82, thus opening the electrical circuit to solenoid 45. At this point diaphragm 47 returns to its neutral position, with gear 57 out of mesh with gears 56 and 62. Pointer 42 therefore remains at this position over its scale by action of pawl 66, spring 67 and ratchet wheel 65. The pointer remains in this position during approximately the next 150 degrees rotation of shaft 81. During this period, the reading of the pointer on the scale is an indication of the rate at which fuel flowed through meter 43 on the first half revolution of shaft 81. When cam follower 85 reaches the raised position 92 on cam 79, arm 83 is caused to rise, closing contacts 82 and 93. The closing of these contacts energize solenoid 44, causing plunger 71 to move to the left. This movement causes flow of air to enter case vent 51, bleed hole 52a, tube 50, suction cavity 74 and thence to the source of suction. This flow of air causes diaphragm 48 to be depressed and moves arm 58 toward diaphragm 48. This movement of arm 58 causes pin 68 to raise the pawl 66 from ratchet wheel 65 thereby causing pointer 64 to be returned to zero by action of hair spring 93. As shaft 81 continues to rotate, cam follower 89 rises on cam 80 to its original level, and follower 85 descends from raised portion 92 to open contacts 82, 93, in which position the mechanism is ready to start the next cycle.

Figure 9:
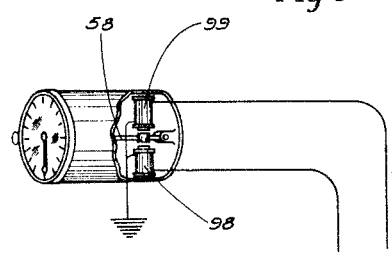
Figure 9 shows an alternate arrangement of Figure 5 in which the electromagnets are placed within the indicator and thereby eliminating the use of suction.

The arrangement of rate of flow meter shown in Figure 5 may be modified, if desired, to eliminate the pneumatic operation of the arm 58. Figure 9 shows such an arrangement in which diaphragms 47 and 48 have been replaced by solenoids 98 and 99. In this arrangement no source of suction is required and the electromagnetic suction valve shown in Figure 7 is eliminated entirely. The operation of the arrangement shown in Figure 9 is identical with that described except that solenoids 98 and 99 operate the arm 58 directly.

While applicants have shown and described several embodiments of their invention by way of illustration, various changes may be made by those skilled in the art without departing from the spirit of this invention, and it will be understood that applicants do not intend to limit their invention other than by the scope of the appended claims.

What we claim as new and desire to secure by Letters Patent is:

1. A rate indicator comprising, in combination, a summation device having electrical make and break means, a stop watch mechanism including an indicating element driven thereby, electro mechanical means associated with said stop watch mechanism and operated by said make and break means for cyclically successively starting and stopping said stop watch mechanism and re-setting said indicating element whereby the rate of operation of said summation device is periodically indicated.

2. A rate indicator comprising, in combination, a summation device having electrical make and break means, a timing mechanism including an indicating element drivingly controlled thereby, electro mechanical means associated with said timing mechanism and operated by said make and break means for cyclically successively starting and stopping said timing mechanism and re-setting said indicating element whereby the rate of operation of said summation device is periodically indicated.

3. A rate of fluid flow meter comprising, in combination a fluid meter for measuring the volume of fluid flow, a stop watch mechanism including an indicating element driven thereby, and electro mechanical means operatively associated with said meter and said stop watch for cyclically successively starting and stopping said stop watch mechanism and re-setting said indicating element whereby the rate of operation of said fluid meter is periodically indicated.

4. An air speed indicator comprising, in combination, a fluid log impeller, a stop watch mechanism having an indicator drivingly connected therewith, an electro mechanical means operatively associated with said log impeller and said stop watch mechanism for cyclically successively starting and stopping said mechanism and resetting said indicator whereby the rate of operation of said log impeller is periodically indicated.

5. A rate of fluid flow indicator comprising, a timing mechanism, means for indicating rate of fluid flow, means for measuring a predetermined unit volume, and pneumatically controlled means for operatively connecting said indicating means and said timing mechanism at the beginning of the measurement of each unit volume and for disengaging the same at the end of said measurement, further means for thereafter re-setting said indicating means to zero and means controlled by said measuring means for controlling said pneumatically controlled means and said re-setting means.

6. A rate of fluid flow indicator comprising, a timing mechanism, means for indicating rate of fluid flow, means for measuring a predetermined unit volume, and electro-magnetically controlled pneumatic means responsive to said measuring means for operatively connecting said indicating means and said timing mechanism at the beginning of the measurement of each unit volume and for disengaging the same at the end of said measurement and further means for thereafter re-setting said indicating means to zero.

7. A rate of fluid flow indicator comprising, a timing mechanism, means for indicating rate of fluid flow, means for measuring a predetermined unit volume, means for operatively connecting said indicating means and said timing mechanism at the beginning of the measurement of each unit volume and for disengaging the same at the end of said measurement, means for maintaining said indicator in indicating position and for resetting the same between measurements, including means controlled by said connecting means for releasing said indicating means.

CARL J. CRANE.
FRANCIS G. NESBITT.